(12) United States Patent
Hartl

(10) Patent No.: US 10,643,363 B1
(45) Date of Patent: May 5, 2020

(54) SYSTEM AND METHOD FOR A USER INTERFACE DEVICE WITH ADAPTIVE OBFUSCATION

(71) Applicant: Curfuffles LLC, Canton, MI (US)

(72) Inventor: Thomas Hartl, Canton, MI (US)

(73) Assignee: Curfuffles LLC, Canton, MI (US)

( * ) Notice: Subject to any disclaimer, the term of this patent is extended or adjusted under 35 U.S.C. 154(b) by 0 days.

(21) Appl. No.: 16/199,802

(22) Filed: Nov. 26, 2018

(51) Int. Cl.
  *G06T 11/60* (2006.01)
  *G06K 9/03* (2006.01)
  *G06F 3/14* (2006.01)
  *G06F 3/0488* (2013.01)

(52) U.S. Cl.
  CPC .......... *G06T 11/60* (2013.01); *G06F 3/04886* (2013.01); *G06F 3/1423* (2013.01); *G06K 9/033* (2013.01); *G06K 2209/01* (2013.01); *G06T 2210/36* (2013.01)

(58) Field of Classification Search
  CPC . G06T 11/60; G06T 2210/36; G06K 2209/01; G06K 9/033
  See application file for complete search history.

(56) References Cited

U.S. PATENT DOCUMENTS

| | | | |
|---|---|---|---|
| 2016/0092409 A1* | 3/2016 | Le Henaff | G06F 17/212 715/269 |
| 2017/0011212 A1* | 1/2017 | Rowlingson | G06T 5/50 |
| 2018/0004976 A1* | 1/2018 | Davis | G06F 21/6254 |
| 2018/0107879 A1* | 4/2018 | Laput | G06F 3/01 |
| 2018/0189510 A1* | 7/2018 | Seko | H04N 21/41407 |

* cited by examiner

*Primary Examiner* — Ryan R Yang
(74) *Attorney, Agent, or Firm* — Fishman Stewart PLLC

(57) ABSTRACT

Systems and methods for adaptive obfuscation may include a user interface device, a hardware processor, and memory communicatively connected to the hardware processor. The user interface device may include a first hardware display with a first active display area, a first mirrored display area, and a first input area. The hardware processor may be configured to provide operations including receive a plurality of objects including first and second objects having respective first and second character sets with a predefined character length, select an obfuscation scheme defining an obfuscation condition, and obfuscate the first and second character sets according to the selected obfuscation scheme, and display the first character set in the first active display area and the second character set in the first mirrored display area.

20 Claims, 6 Drawing Sheets

SYSTEM AND METHOD FOR A USER INTERFACE DEVICE WITH ADAPTIVE OBFUSCATION

BACKGROUND

Various security measures, such as a Completely Automated Public Turing test to tell Computers and Humans Apart ("CAPTCHA"), have been utilized in attempt to prevent software applications that run automated tasks (referred to herein as "automated users" or "bots") from accessing programs such as websites and software that are intended for human users. Traditional methods attempt to differentiate between human users and automated users include using static pictures or words that can be recognized by bots. Further, typical methods are time consuming and difficult to use. As processing power and artificial intelligence evolve, bots are likely to employ more sophisticated methods of mimicking human users to bypass typical security measures.

There is a need for improved systems and methods to automatically distinguish between human and automated users and to resist or prevent automated users from accessing programs intended for human users. This may include a user interface device having an adaptive obfuscation scheme with obscured portions. For instance, such an obfuscation scheme may be configured to overcome the drawbacks of traditional techniques while improving the ability to quickly and accurately distinguish between human and automated users.

DETAILED DESCRIPTION

Figure 1:
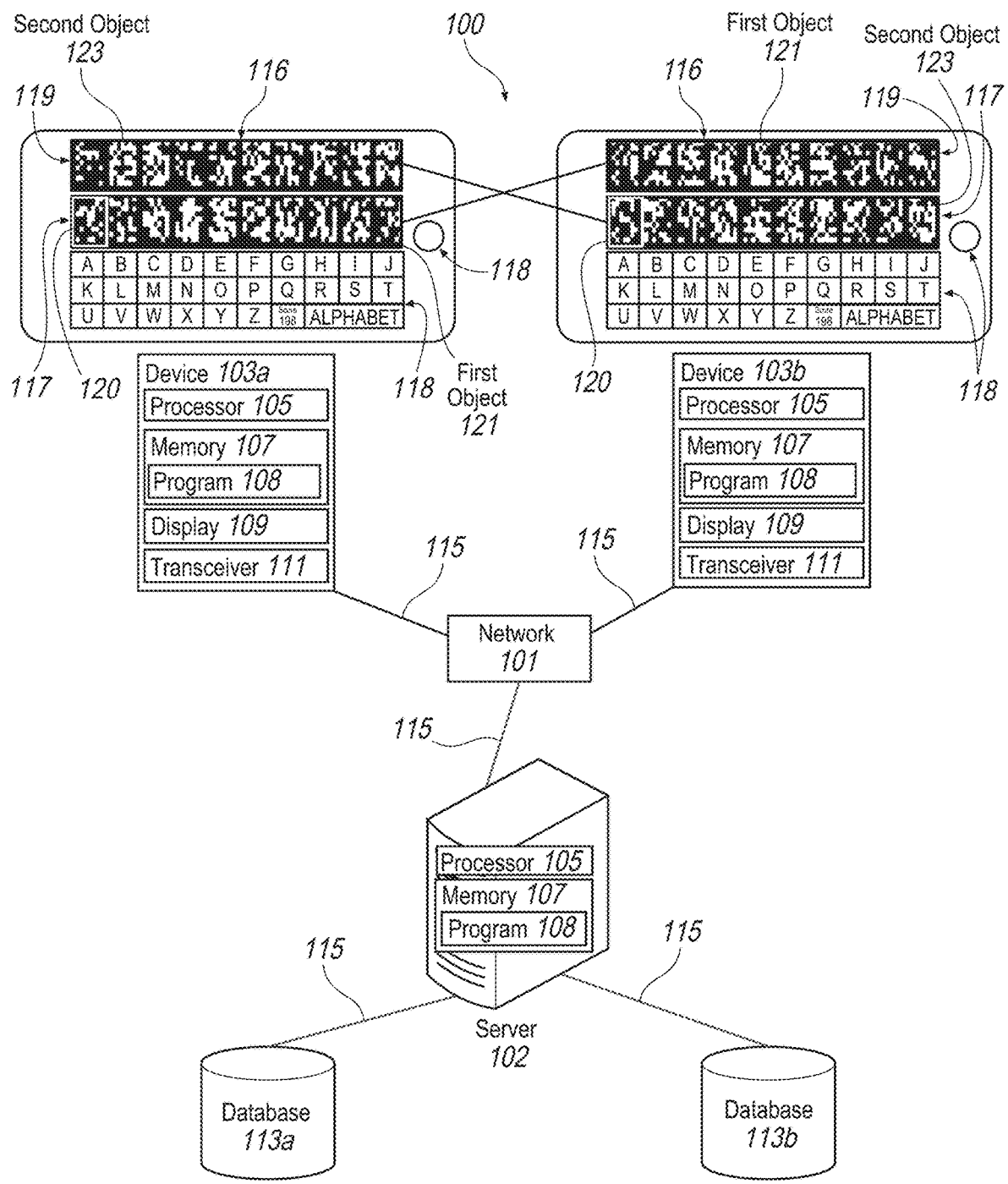
FIG. 1 illustrates an exemplary system of the present disclosure.

A system of the present disclosure may include a user interface device with adaptive obfuscation configured to distinguish between human and automated users. The system may include first and second user interface devices with respective first and second users. The first and second devices may be in communication with a server and one or more databases by way of a network. The first and second devices may each include a hardware display with a user interface screen configured to display first and second objects including, e.g., respective first and second character sets with a plurality of characters. The first and second objects may include portions that are obscured according to an obfuscation scheme, e.g., using randomized or patterned dots or a pixilated image as described in further detail below. As described in further detail below, the obfuscation scheme may be based on adaptation factors, user inputs, or external inputs, which may be used in combination or interchangeably.

The first and second devices may be configured to adapt the first and second objects including object portions. The first and second objects may include first and second character sets with a plurality of characters, e.g., arranged to convey a meaning such as by forming a word. The first and second devices may adapt the first and second objects between an obscured condition, a partially obscured condition and a revealed condition.

The first and second devices of respective first and second users may adapt the first and second objects according to the obfuscation scheme, e.g., using adaptation factors, user inputs, and/or external inputs. The first and second objects may be adapted between obscured, partially obscured and revealed conditions according to an obfuscation scheme, e.g., automatically using an adaptation factor such as at a first reveal rate. The first and second objects of the first or second device may be adapted between obscured, partially obscured and revealed conditions in response to the obfuscation scheme, e.g., in response to user inputs such as selections of the first or second device as attempts to guess the revealed condition of the object portion on the first or second device. The first and second objects of the first device may be adapted according to the obfuscation scheme, e.g., in response to external inputs such as selections of the second device as attempts to guess the revealed condition of the object portion on the second device, or vice versa.

The first device may adapt one or a plurality of objects. For example, in response to user inputs such as a correct selection of a character by the first device or external inputs such as an incorrect selection of a character by the second device, the first device may adapt one or more object portions (e.g., a character of a character set) from the obscured condition to the revealed condition according to the obfuscation scheme. The obfuscation scheme may include an adaptation factor to reveal the object portion according to a reveal rate, e.g., immediately or over a predefined time period. Thus, user inputs such as correct selections by the first device or external inputs such as incorrect selections by the second device may reveal characters of the character set of the first device and change (e.g., decrease or increase) the reveal rate of the second device, or vice versa. Alternatively or in addition, user inputs such as incorrect selections by the first device or external inputs such as correct selections by the second device may further obscure characters of the character set of the first device and change (e.g., increase or decrease) the reveal rate of the second device, or vice versa may reveal characters.

The second device may also adapt one or a plurality of objects. In response to an incorrect selection by the first device or a correct selection of a character by the second device, the second device may adapt one or more objects portions, e.g., from the obscured condition to a partially revealed condition according to the obfuscation scheme. For example, an adaptation factor may include a second reveal rate that is faster than the first reveal rate of the first character set. Thus, incorrect selections by the first device or correct selections by the second device may increase the reveal rate of the second character set of the first device, or vice versa may decrease the reveal rate.

By changing the objects according to adaptation factors while decreasing obfuscation of objects in response to correct selections and increasing obfuscation in response to incorrect selections, more precise selections from a human user may be required to guess the object while random or sequenced selections from an automated user will result in the objects being further obscured. Thus, the obfuscation scheme may be configured to allow a human user to quickly and accurately recognize the object while resisting an automated user from doing the same.

FIG. 1 illustrates an exemplary system 100, for example, configured to provide adaptive obfuscation. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the system 100 may include a network 101, a server 102, one or more devices 103 (e.g., user interface devices 103a-b), a processor 105 (e.g., a hardware processor), memory 107 (e.g., physical memory), program 108, display 109 (e.g., a hardware display), transceiver 111, one or more databases 113 (e.g., databases 113a-b), and connections 115. The server 102 and devices 103a-b may include processor 105 and memory 107 including program 108 providing user interface screen 116 (e.g., by way of display 109) that is generated by way of instructions (e.g., on memory 107) that when executed (e.g., by processor 105) provide the operations described herein.

The system 100 may be configured to transfer obfuscation information (e.g., objects 121, 123) throughout the system 100 by way of connections 115. The system 100, e.g., devices 103a-b and server 102, may be configured to receive and send (e.g., using transceiver 111), transfer (e.g., using transceiver 111 and/or network 101), compare (e.g., using processor 105), and store (e.g., using memory 107 and/or one or more databases 113a-b) with respect to server 102 and devices 103a-b. Devices 103a-b and server 102 may be in communication with each other to adapt (e.g., by respective processors 105) the first and second objects. The first and/or second objects 121, 123 may be adapted according to an obfuscation scheme, e.g., based on adaptation factors, and/or in response to user and/or external inputs from any or all of devices 103a-b and server 102 as discussed in further detail below.

The memory 107 and databases 113a-b may store obfuscation information including and/or associated with objects 121, 123. Each memory 107 and database 113a-b may store the same or different portions of the obfuscation information. For example, a first memory 107 and/or first database 113a may store obfuscation information (e.g., associated with the first object 121, the first device 103a, and the first user) and second memory 107 and/or second database 113b may store obfuscation information (e.g., associated with the second object 123, the second device 103b, and the second user).

As shown in FIG. 1, the system 100 may include device 103 configured to display (e.g., by display 109) one or a plurality of objects (e.g., first and second objects 121, 123). The system 100 may include a plurality of user interface devices 103 (e.g., first and second devices 103a-b of respective first and second users). Display 109 may include an active display area 117, a mirrored display area 119 and a user input area 118. The active display area 117 may include object 121 (e.g., a first object such as a first character set with a plurality of characters) and mirrored display area 119 may include object 123 (e.g., a second object such as a second character set with a plurality of characters). As described in further detail below with respect to FIG. 2, object 121 may include object portions 121a-j (e.g., the plurality of characters) and object 123 may include object portions 121a-j (e.g., the plurality of characters). The active display area 117 may include object 121 and the mirrored display area 119 may include object 123, or vice versa. The user input areas 118 may include a displayed or physical keyboard configured to receive user inputs (e.g., selections or guesses).

Device 103 may be configured display (e.g., by display 109) user interface screen 116 including a selection box 120 that is movable over the object portions 121, e.g., characters of the first character set. For example, the selection box 120 may be moved over a character of the first character set by way of user inputs (e.g., by way of user input areas 118), the first device 103a may adapt (e.g., by processor 105) that character from the obscured condition to the partially obscured condition according to the obfuscation scheme including, e.g., at the first reveal rate such as a slower rate. The first device 103a may display a prompt for and receive a selection (e.g., guess) for the character of the first character set. For example, the prompt may include the display of selection box 120 by display 109. In response to a correct selection, the first device 103a may adapt that character from the partially obscured condition to the revealed condition according to the obfuscation scheme (e.g., immediately revealing the character), and move the selection box 120 to another character of the first character set (e.g., automatically or by way of user and/or external inputs). In response to an incorrect selection by the first device 103a, the second device 103b may adapt a character of the second character set to the partially obscured condition according to the obfuscation scheme, e.g., at a second reveal rate that is a faster rate than the first reveal rate of the first device 103a. Thus, correct selections may immediately reveal characters of the respective character set, but incorrect selections may increase the reveal rate of the other character set.

Devices 103a-b may include respective displays 109 with user interface screens 116 configured to be mirrored relative to each other. The mirroring may be symmetrical or inverted along a vertical or horizontal axis of display 109. The first object 121 may be displayed in the active display area 117a of device 103a and the same first object 121 may be displayed in the mirrored display area 119b of device 103b. Similarly, the second object 123 may be displayed in the active display area 117b of device 103b and the same second object 123 may be displayed in the mirrored display area 119a of device 103a. As the first object 121 is adapted by the first device 103a, the same first object 121 is mirrored over to the second device 103b. As the second object 123 is adapted by the second device 103b, the same second object 123 may be mirrored over to the first device 103a. Thus, device 103a or 103b may be configured to adapt object 117 or 119 while viewing the other of objects 121 or 123 being adapted by the other one of device 103a or 103b.

For example, the first and second objects 121, 123 may be displayed in a first orientation on the first device 103a and in a second orientation on the second device 103*b*, e.g., in an inverted orientation relative to each other. The first device 103*a* may include a first user interface screen 116*a* with an active display area 117*a*, a mirrored display area 119*a*, and an input area 118*a*. The second user interface device 103*b* may include a second user interface screen 116*b* with a second active display area 117*b*, a second mirrored display area 119*b*, and a second input area 118*b*. The active display area 117*a* may be configured to display a first object of a plurality of objects and the active display area 117*b* may be configured to display a second object of a plurality of objects. The mirrored display area 119*a* may be configured to display the second object of the active display area 117*b* and the mirrored display area 119*b* may be configured to display the first object of the active display area 117*a*. The first and second objects 121, 123 may be synchronized between the first and second devices 103*a-b*. Alternatively, the first and second objects 121, 123 may be displayed in the same orientation or any other orientation relative to each other.

The system 100 may be configured to utilize one or a plurality of objects 121, 123 that are recognizable to a human user. The plurality of objects 121, 123 (e.g., first and second objects) may be of the same or different types. Objects 121, 123 may include any image, sound, or tactile output or a combination thereof that is observable by a human user. The objects 121, 123 may include object portions, e.g., character sets including one or a plurality of characters. The characters may include letters, numbers, or symbols or a combination thereof. Objects may include numeric characters (e.g., all numbers) or alphanumeric characters (e.g., letters and numbers). The objects 121, 123 may be in any orientation, e.g., aligned as text, a pattern or randomly distributed. The objects 121, 123 may have the same or varying fonts, typefaces, languages, hand-writing styles, or a combination thereof. For example, objects may include multi-language characters (e.g., letters from one or a plurality of languages). The objects 121, 123 may include any punctuation, accent, subscript, or superscript marks including diacritics such as umlauts. The objects 121, 123 may include characters in sequence or parallel so as to form gibberish (e.g., having no particular meaning) or a word (e.g., having at least one meaning such as a dictionary meaning).

The system 100 may include one or a plurality of obfuscation schemes including one or more adaptation factors for adapting the objects 121, 123. For example, an adaptation factor may include a predefined time period having fixed or variable frequency for adapting the objects 121, 123. An adaptation factor such as an adaptation rate that may obscure and unobscure objects instantaneously, consistently, progressively or randomly. An adaptation factor may include a slowly, rapidly or instantly-changing pattern that may be sequenced or random. An adaptation factor may include a noise factor such as audio noise (e.g., background or foreground), visual noise (e.g., motion, reversing, resizing, rotating, shearing, warping, obstructions), or a combination thereof. An adaptation factor may include a false or misleading object (e.g., causing an automated user to guess an incorrect selection, but a human user readily recognizing it as false or misleading to avoid an incorrect selection). An adaptation factor may be configured to manipulate visibility, transparency, or completeness of the object, or a combination thereof. An adaptation factor may include a color assumption that displays an object (e.g., character or character set) in an obscured condition that is colored to provide a hint of the object in a revealed condition, e.g., an object portion being colored yellow, brown or chestnut as a hint for character set forming the words that respectively start with "y," "b" or "c." The adaptation factors may be configured to adapt objects 121, 123 that are readily recognized by human users, but not automated users.

System 100 may be configured to adapt objects 121, 123 according to one or a plurality of obfuscation schemes. The plurality of obfuscation schemes may adapt objects 121, 123 according to the same, different, or changing adaptation factors and/or user and/or external inputs. Obfuscation schemes may adapt according to the type of object, e.g., applying a first obfuscation scheme for a first type of object and a second obfuscation scheme for a second type of object. Obfuscation schemes may adapt according to the obfuscation condition of the object, e.g., applying a first obfuscation scheme initially (e.g., while the object is in an obscured condition) and alternatively or additionally apply a second obfuscation scheme at a predefined time or obfuscation condition of the object (e.g., a predefined portion of the object is unobscured or partially obscured). Thus, the system 100 may provide multi-level adaptation, e.g., adapting the overall obfuscation schemes while adapting the underlying objects 121, 123. Such adaptations may be configured to be readily recognizable by a human user, but not an automated user.

Devices 103*a-b* and server 102 may be configured to adapt (e.g., by processor 105) one or more objects with an obfuscation scheme (e.g., on memory 107 and by way of program 108). System 100 may also be configured for adaptive obfuscation. Devices 103*a-b* and server 102 may be configured to provide operations to receive a plurality of objects including first and second objects having respective first and second character sets with a predefined character length, select (e.g., by processor 105) an obfuscation scheme defining an obfuscation condition according to at least one of an obscured condition, a partially obscured condition, and a revealed condition, and obfuscate (e.g., by processor 105) the first and second character sets to the obscured condition according to the selected obfuscation scheme. Devices 103*a-b* may be configured to provide operations to display (e.g., by display 109) the first character set in the first active display area 117*a* and the second character set in the first mirrored display area 119*a*, and/or the second character set in the second active display area 117*b* and the first character set in the second mirrored display area 119*b*. The system may be configured to display the first and second character sets being in the obscured, partially obscured, and revealed condition.

The system 100 may also be configured to adapt a plurality of objects in response to user responses. For example, the system 100 may adapt (e.g., by the processor 105) a first character of the first character set to a partially obscured condition or a further obscured condition according to the obfuscation scheme and display (e.g., by display 109) the first character in the partially obscured or further obscured condition. The system 100 may display (e.g., by display 109) a first prompt (e.g., selection box 120) for a first selection for the first character of the first character set, receive (e.g., by way of a first user input into the first input area 118*a* of display 109) the first selection for the first character, and determine (e.g., by processor 105) that the first selection is a correct selection matching the first character or an incorrect selection not matching the first character.

The system 100 may further respond based on the accuracy of user responses and the progress of the user in revealing the object. For example, in response to a correct selection, the system 100 may adapt (e.g., by processor 105 on display 109) the first or second object (e.g., including respective character sets with one or more characters) to the revealed condition. In contrast, in response to an incorrect selection, the system 100 may adapt (e.g., by the hardware processor 105 and on display 109) the first or second object (e.g., one or more characters) to an obscured or partially obscured condition. Thus, correct guesses unobscure the first and second objects while incorrect guesses further obscure the first and second objects.

The system 100 may determine whether the first or second object (e.g., including first or second character sets) have any remaining obfuscated portions (e.g., characters of the first or second character sets). In response to at least one portion being in the obfuscated or partially obfuscated condition, the system may display (e.g., by display 109) a prompt for a selection for the first or second object. On the other hand, in response to none of the portions being in the obfuscated or partially obfuscated condition, the system 100 may provide (e.g., by display 109) access to a target display area, e.g., having information related to the human user.

The system 100 may be configured to provide adaptive obfuscation using a plurality of user interface devices 103. For example, the system 100 may include a second user interface device 103*b* in communication with the first user interface device 103*a*. The second user interface device 103*b* may include display 109 with a second active display area 117*b*, a second mirrored display area 119*b*, and a second input area 118*b*. In response to a selection by the first user interface device 103*a*, the system 100 may be configured to receive, by the second user interface device 103*b*, the first and second objects having the obfuscation condition according to the first user interface device 103*a*. The system 100 may further be configured to display, by the display 109 of the second user interface device 103*b*, a first object (e.g., a first character set) in the second mirrored display area 119*b* and a second object (e.g., a second character set) in the second active display area 117*b* while the first user interface device 103*a* displays the first object (e.g., first character set) in the first active display area 117*a* and the second object (e.g., the second character set) in the first mirrored display area 119*a*.

The system 100 may include a network that provides the infrastructure through which the server 102, devices 103*a-b*, and one or more databases 113 may communicate, for example, to distribute and compare objects to control access to a target display area (e.g., having controlled information). For instance, the network may be an infrastructure that generally includes edge, distribution, and core devices (e.g., server 102) and enables a path (e.g., connection 115) for the exchange of obfuscation information between different devices and systems (e.g., between server 102, devices 103*a-b*, and one or more databases 113). In general, a network (e.g., system 100 or network 101) may be a collection of computers and other hardware to provide infrastructure to establish connections and carry communications.

The system 100 may utilize network 101 with any networking technology to provide connections 115 between any of network 101, server 102, devices 103*a-b*, and one or more databases 113. The connections 115 may be any wired or wireless connections between two or more endpoints (e.g., devices or systems), for example, to facilitate transfer of obfuscation information between any portions of system 100. System 100 may utilize transceiver 111 in communication with network 101, e.g., any wired or wireless network. The network 101 may include a packet network or any other network having an infrastructure to carry communications. Network 101 may be configured to provide communications services to and between a plurality of devices (e.g., server 102 and devices 103*a-b*).

The server 102 may include any computing system configured to communicatively connect with the devices 103 and one or more databases 113. The server 102 may be connected, via connection 115, to the network 101, devices 103, and one or more databases 113. Server 102 may be in continuous or periodic communication with devices 103. Server 102 may include a local, remote, or cloud-based server and may be in communication with devices 103*a-b* and receive obfuscation information from one or more databases 113*a-b*. The server 102 may further provide a web-based user interface (e.g., an internet portal) to be displayed by any of the display 109 of device 103. In addition, the server 102 may be configured to store obfuscation information as part of memory 107 as part of server 102 or one or more databases 113 connected to server 102. The server 102 may include a single or a plurality of centrally or geographically distributed servers 102.

Device 103 may be configured to provide user interface screen 116 configured to be generated by processor 105 and displayed as part of display 109. The user interface screen 116 may include one or a plurality of user profiles associated with a computer operating system of the device 103. The device 103 may include one or a plurality of user interface screens 116, e.g., each being associated with a different user or user profile. The user interface screen 116 may be launched using the processor 105 and displayed as part of the display 109. The user interface screen 116 may include one or more applications.

The display 109 may include a hardware display configured to present or display the user interface screen 116. The devices 103*a-b* may each include the same or a different display 109 or screen 116. The display 109 may include a computer display, support user interfaces, and/or communicate within the system 100. The display 109 may include any output device for presentation or receipt of information in visual or tactile form. Examples of a display may include, without limitation, cathode ray tube display, light-emitting diode display, electroluminescent display, touchscreen, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, or a combination thereof.

Transceiver 111 may communicatively connect the devices of system 100, for example, using any type of wired or wireless network connection (e.g., connection 115). The wireless network may utilize a wireless transmitter (e.g., cellular, radiofrequency (RF) or Wi-Fi transmitter) of transceiver 111. Transceiver 111 may be configured to communicatively connect any or all of network 101, server 102, and devices 103*a-b*. Transceiver 111 may be used for digital or analog signal transfers. For instance, transceiver 111 may include any antenna technology including cellular, radiofrequency (RF), near field communication (NFC), Bluetooth®, Wi-Fi, or the like. Transceiver 111 may include any technology that implements a wireless exchange of obfuscation information by converting propagating electromagnetic waves to and from conducted electrical signals. Transceiver 111 may include any technology that is used to exchange obfuscation information wirelessly using radio waves over a radio range or network that enables communication. The transceiver 111 may also include a location determination technology that enables the determination of location information (e.g., a current geographic position) of any of devices 103a-b. Examples of location determination technology may include, without limitation, global positioning systems (GPS), indoor positioning system, local positioning system, and mobile phone tracking. The transceiver 111 may be configured to provide a current geographic position of any of devices 103a-b.

Any portion of system 100 (e.g., server 102 and devices 103a-b) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The system 100 and server 102, devices 103a-b, and one or more databases 113 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., server 102 and devices 103a-b) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, mobile devices, cellular phones, smartphones, super-phones, tablet computers, next generation portable devices, mobile printers, handheld computers, notebooks, laptops, desktops, computer workstations, a server, secure voice communication equipment, networking hardware, or any other computing system and/or device.

Further, processors such as processor 105 receives instructions from memories such as memory 107 or one or more databases 113 and executes the instructions, thereby performing one or more processes, including one or more of the processes described herein. Such instructions and obfuscation information may be stored and transmitted using a variety of computer-readable mediums (e.g., memory 107 or one or more databases 113). Processors such as processor 105 may include processes comprised from any hardware, software, or combination of hardware or software that carries out instructions of one or more computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

A memory such as memory 107 or one or more databases 113 may include, in general, any computer-readable medium (also referred to as a processor-readable medium) that may include any non-transitory (e.g., tangible) medium that participates in providing obfuscation information or instructions that may be read by a computer (e.g., by the processors 105 of the server 102 and devices 103a-b). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The server 102 and devices 103a-b may include processor 105 that is configured to perform operations with respect to the obfuscation information, for example store obfuscation information as part of memory 107 or one or more databases 113. The server 102 and device 103 (e.g., devices 103a-b) may further utilize the processor 105 and transceiver 111 to transfer, access, compare, synchronize, and map obfuscation information between memory 107 and database 113. Further, databases, data repositories or other information stores (e.g., memory 107 and one or more databases 113) described herein may generally include various kinds of mechanisms for transferring, storing, accessing, and retrieving various kinds of obfuscation information, including a hierarchical database, a set of files in a file system, an application database in a proprietary format, a relational database management system (RDBMS), etc. Each such obfuscation information store may generally be included as part of memory 107 or one or more databases 113 (e.g., external to, local to, or remote from the server 102 and devices 103a-b) and may be accessed with a computing system and/or device (e.g., server 102 and devices 103a-b) employing a computer operating system such as one of those mentioned above, and/or accessed via a network (e.g., system 100 or network 101) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The computing systems herein may include any electronic hardware that includes a processor 105, memory 107 and/or transceiver 111 that is capable of performing the operations discussed herein including the transfer, synchronization and adaptation of obfuscation information as well as providing access to a target display area in response user responses. To accomplish the operations herein, the computing systems herein may be configured to utilize communications technologies including, without limitation, any wired or wireless communication technology, such as cellular, near field communication (NFC), Bluetooth®, Wi-Fi, and radiofrequency (RF) technologies. Communication technologies may include any technology configured to exchange electronic information by converting propagating electromagnetic waves to and from conducted electrical signals.

Figure 2:
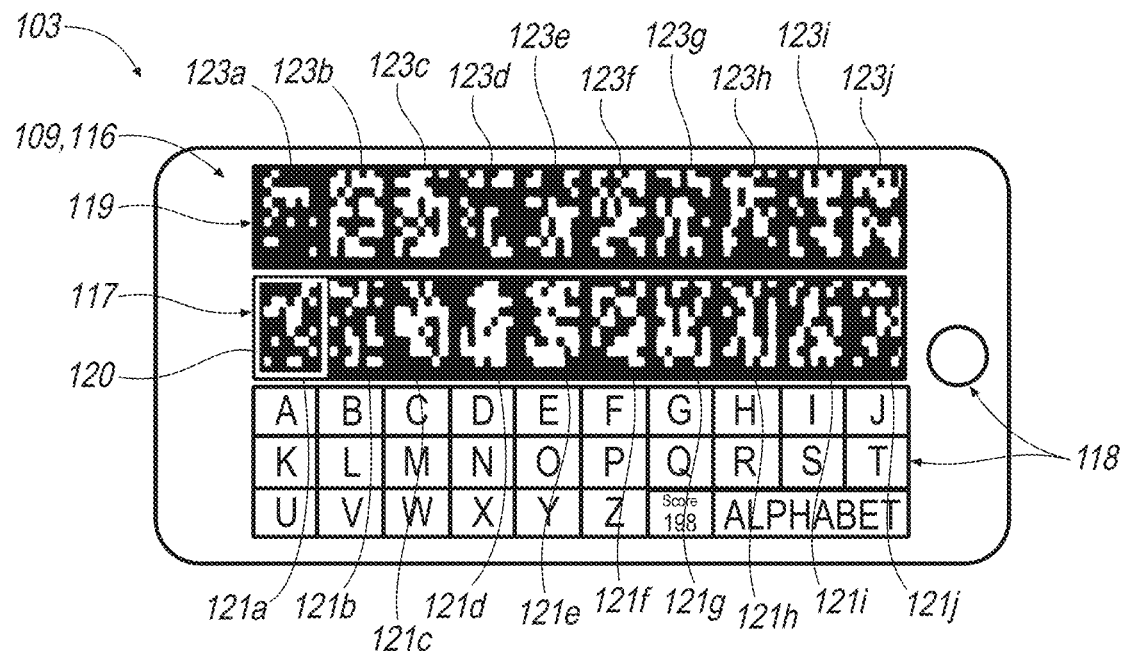
FIG. 2 illustrates an exemplary user interface device of the present disclosure, e.g., with first and second objects with one or more portions in an obscured condition.

FIGS. 2-5 illustrate an exemplary user interface device 103, e.g., with first and second objects with respective first and second character sets in obscured, partially obscured and revealed conditions. Device 103 may take many different forms and include multiple and/or alternate components and/or implementations. While an exemplary device is shown in FIG. 2, the illustrations are not intended to be limiting. Indeed, additional or alternative components and/or implementations may be used.

Figure 3:
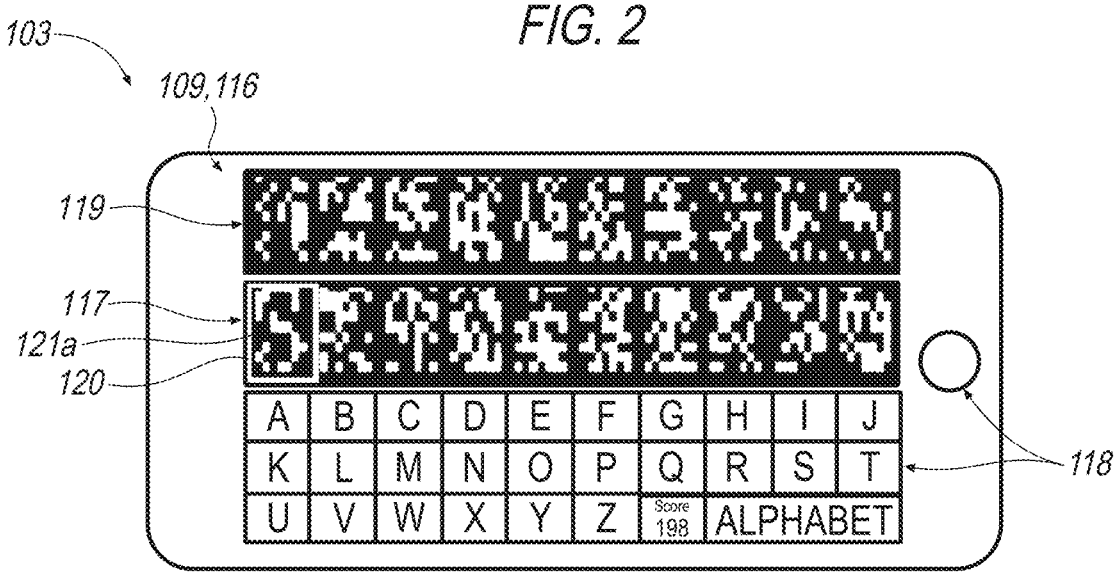
FIG. 3 illustrates an exemplary user interface device of the present disclosure, e.g., with first and second objects with one or more portions in a partially obscured condition.
Figure 4:
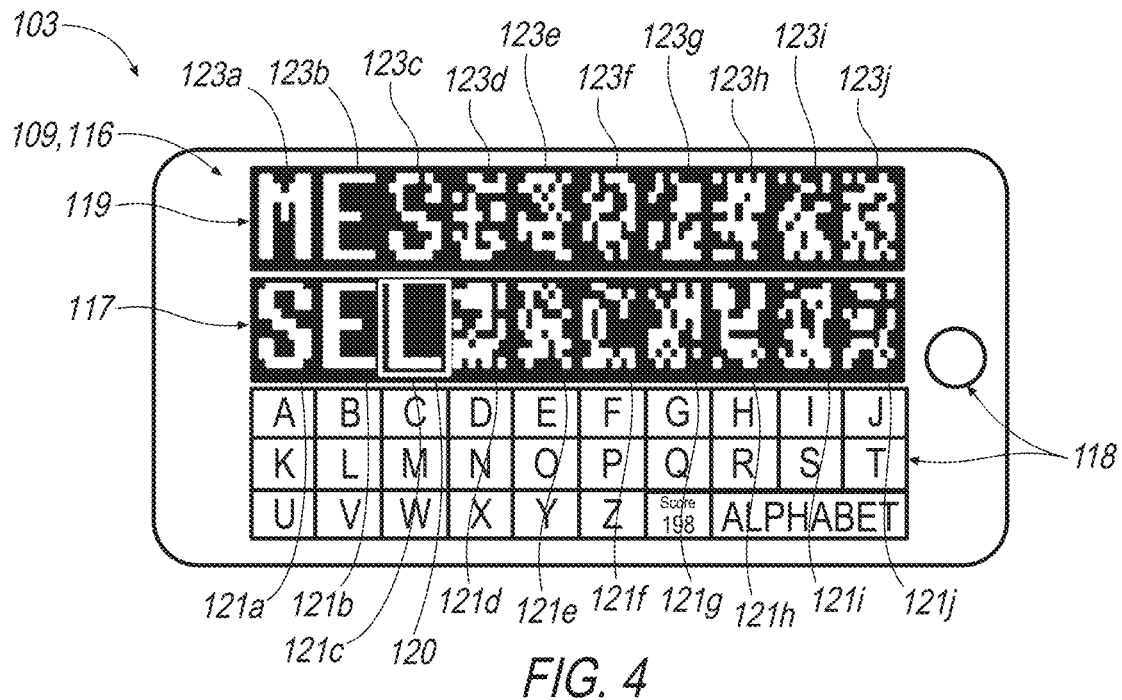
FIG. 4 illustrates an exemplary user interface device of the present disclosure, e.g., with first and second objects with one or more portions in a revealed condition.
Figure 5:
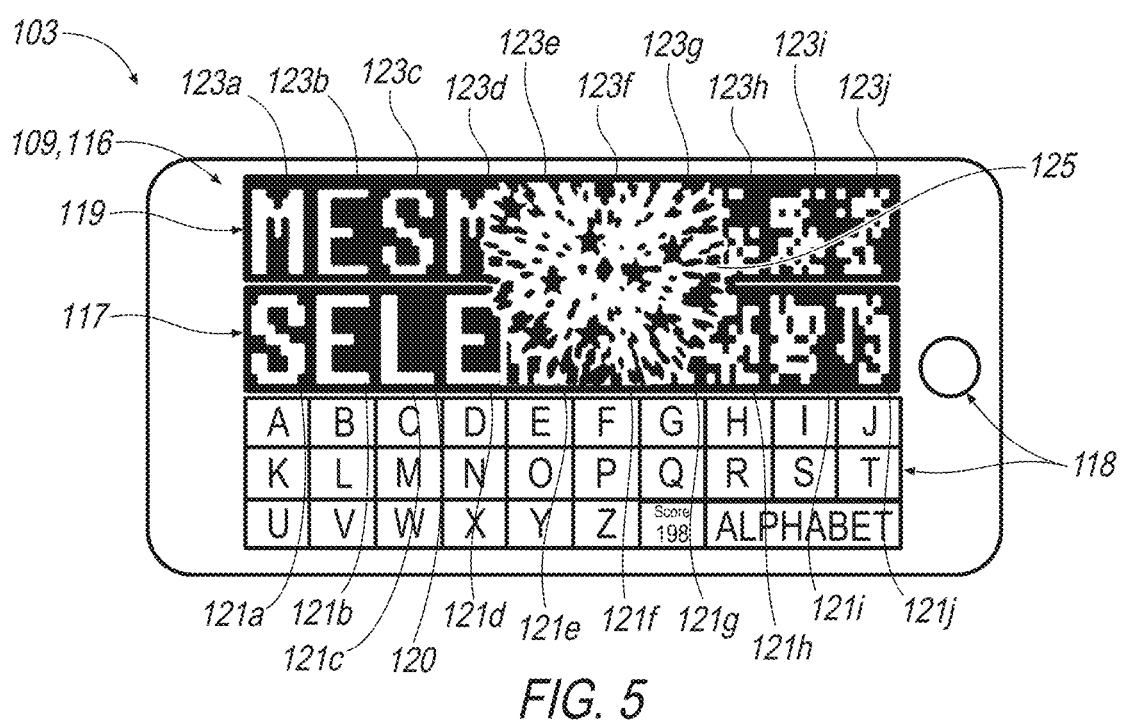
FIG. 5 illustrates an exemplary user interface device of the present disclosure, e.g., with first and second objects with one or more portions being obstructed by a blocking object.

As illustrated in FIG. 2, device 103 may include display 109 with the first and second objects in the obscured condition. As shown in FIGS. 3-5, device 103 may be configured to adapt objects 121, 123 between an obscured condition (e.g., not recognizable by a human user or an automated user), a partially obscured condition (e.g., more recognizable to a human user, but not an automated user), and a revealed condition (e.g., readily recognizable by a human user). The objects 121, 123 may be adapted in response to an obfuscation scheme, user inputs (e.g., selections by way of user input areas 118 of a first device 103a), external inputs (e.g., selections of user of a second device 103b) or a combination thereof.

Devices 103a-b and server 102 may be configured to adapt (e.g., by processor 105) portions of objects 121, 123 from an obscured condition to a partially obscured condition. For example, objects may be adapted from an obscured condition (e.g., object portion 121a as shown in FIG. 2) to a partially obscured condition (e.g., object portion 121a as shown in FIG. 3), e.g., partially revealing the object portion but not the entire object portion. The adaptation may be according to an obfuscation scheme, e.g., configured to reveal object 117 according to an adaptation factor as described herein. Alternatively or in addition, the adaption may occur in response to user inputs (e.g., by way of input area 118 of device 103a), e.g., adapting the first device 103a in response to a correct or incorrect selection of the first device 103a. Alternatively or in addition, the adaption may occur in response to external inputs (e.g., by way of input area 118 of device 103b), e.g., adapting the first device 103a in response to a correct or incorrect selection of the second device 103b.

With reference to FIGS. 3-4, device 103 may receive user inputs (e.g., selections by way of user input areas 118) as a user attempts to guess a revealed condition of the objects 121, 123. In response to a correct selection matching the revealed condition (e.g., the correct character), device 103 may adapt (e.g., by way of processor 105 on display 109) at least a portion (e.g., the character) of the first or second object to a partially obscured condition (e.g., object portions 121a of FIG. 3) or a revealed condition (e.g., object portions 121a-b of FIG. 4). In response to an incorrect selection, device 103 may adapt (e.g., by way of processor 105 on display 109) at least a portion of the first or second object to an obscured or further obscured condition (e.g., object portions 121e-j of FIG. 4). The devices 103a-b may take turns making selections on respective object portions 121a-j and 123a-j, or the selections may be received simultaneously.

Figure 6:
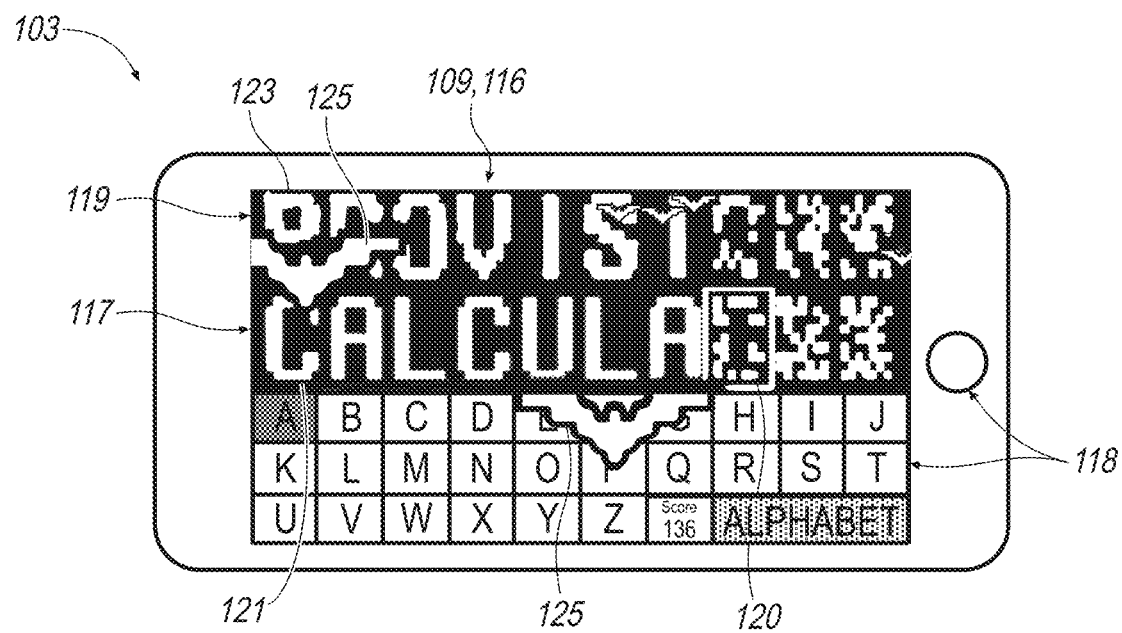
FIG. 6 illustrates another exemplary user interface device of the present disclosure, e.g., with first and second objects with one or more portions being obstructed by a blocking object.
Figure 7:
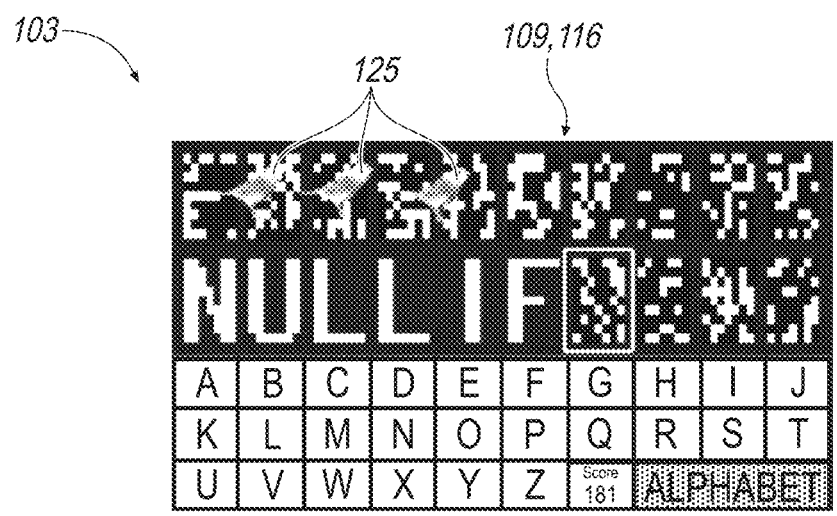
FIG. 7 illustrates another exemplary user interface device of the present disclosure, e.g., with first and second objects with one or more portions being obstructed by one or more blocking objects.
Figure 8A:
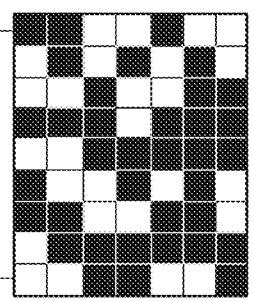
FIGS. 8A-K illustrate exemplary objects of the present disclosure, e.g., with an obfuscation scheme including characters in an obscured condition, partially obscured conditions, and a revealed condition.
Figure 8B:
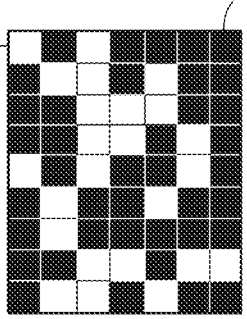
Figure 8C:
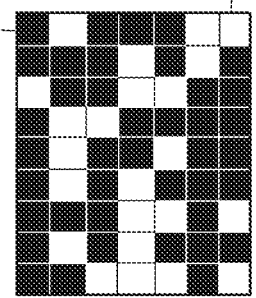
Figure 8D:
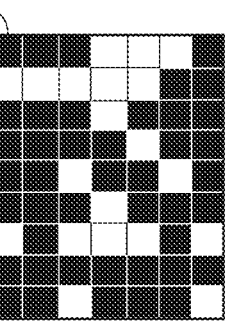
Figure 8E:
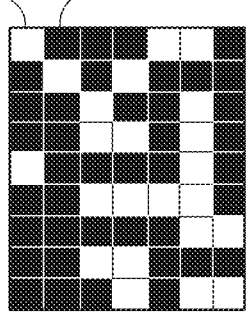
Figure 8F:
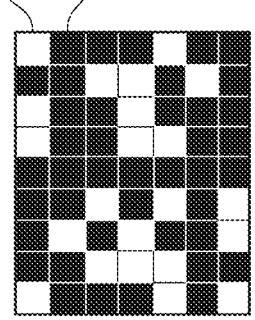
Figure 8G:
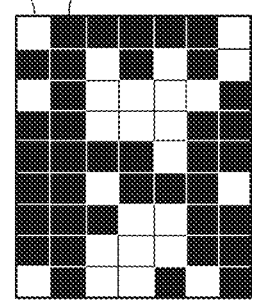
Figure 8H:
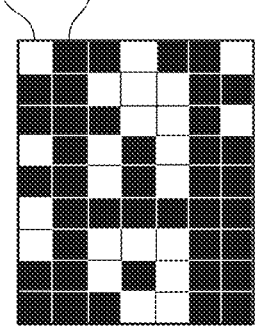
Figure 8I:
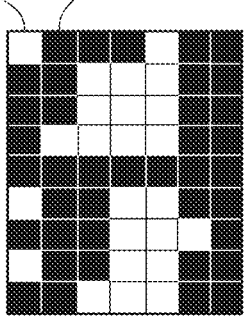
Figure 8J:
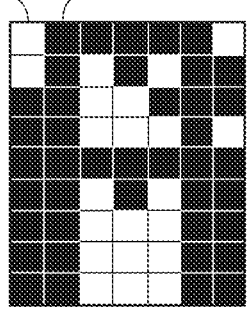
Figure 8K:
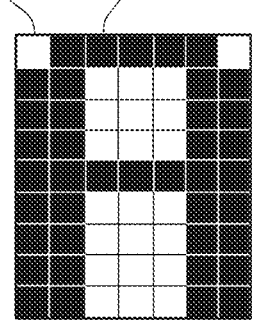

Referring to FIGS. 5-7, device 103 may include user interface screen 116 configured to adapt (e.g., by way of processor 105 on display 109) the first and second objects 121, 123 according to an obfuscation scheme, e.g., including a blocking object 125 over one or a plurality of object portions 121a-j and 123a-j. The blocking object 125 may be displayed in response to an obfuscation scheme, e.g., automatically or in response to user and/or external inputs. As shown in FIG. 5, the blocking object 125 may cover selection box 120 and object portions 121e-f and/or 123e-f. The blocking object 125 may be displayed over active area 117 (e.g., FIGS. 5-6), mirrored area 119 (e.g., FIGS. 5-7), selection box 120 (e.g., FIG. 6), or a combination thereof (e.g., FIGS. 5-6). The blocking object 125 may also include one or a plurality of blocking objects 125 that obstruct all or any portion of object 121 or 123, e.g., in response to user and/or external inputs of the first or second device 103a-b. The blocking object 125 may also be displayed at the top, bottom or sides of user interface screen 116. The blocking object 125 may move across user interface screen 116, e.g., randomly or according to a pattern. Blocking object 125 may include one or more solid, transparent or translucent objects. For example, blocking object 125 may include a starburst (e.g., as shown in FIG. 5) or animals, flowers, sea creatures, bats (e.g., FIG. 6), or birds (e.g., FIG. 7).

The blocking object 125 may be displayed in response to correct or incorrect selections. For example, in response to user inputs such as a correct selection by first device 103a, second device 103b may display user interface screen 116 with blocking object 125 over portions of the first and second objects 121, 123. Alternatively or in addition, in response to user inputs such as an incorrect selection by first device 103a, the first device 103a may display the blocking object 125 and/or the blocking object 125 may be removed from the user interface screen 116 of second device 103b.

FIGS. 8A-K illustrate exemplary objects 117/119 including, e.g., an obfuscation scheme with objects 121, 123 in an obscured condition, partially obscured conditions, and a revealed condition. Objects 121, 123 may take many different forms and include multiple and/or alternate components and/or implementations. While examples are shown in FIGS. 8A-K, the illustrations are not intended to be limiting. Indeed, additional or alternative components and/or implementations may be used.

As illustrated in FIGS. 8A-K, objects 121, 123 may be revealed (e.g., by way of processor 105 on display 109) according to an obfuscation scheme including, e.g., an adaptation factor using a randomized reveal of object portion 121 or 123 having a revealed portion and a randomized portion. The revealed portion may include true dots 127 (e.g., black or shaded) and false dots 129 (e.g., white or unshaded) forming the object portion 121 or 123 (e.g., forming the character). The randomized portion may include true dots 127 and false dots 129 that are randomly populated (e.g., providing no indication of the character). The randomized reveal may include generating a random number (e.g., from 0 to 99) and using the random number as an object proportion (e.g., percentage or ratio) of object portion 121 or 123 (e.g., a character) that is the revealed portion relative to the randomized portion.

The devices 103a-b and server 102 may utilize the obfuscation scheme having the randomized reveal to randomize (e.g., by processor 105) one or more object portions 121 or 123 (e.g., characters) with dots 127, 129. The object portion 121 or 123 may be initially displayed (e.g., by display 109) in an entirely randomized condition with a randomized portion being 100% of the object portion 121 or 123 (e.g., FIG. 8A).

The devices 103a-b and server 102 may utilize (e.g., by processor 105) the obfuscation scheme to randomize object portion 121 or 123 by generating a random number and using the random number as the proportion of the randomized portion to the revealed portion, or vice versa. For example, processor 105 may generate random numbers such as 90, 80, 70, 60, 50, 40, 30, 20, 10 and 0 and then adapting the object portions 121 or 123 to have respective randomized portions of 90%, 80%, 70%, 60%, 50%, 40%, 30%, 20%, 10%, and 0% with the corresponding remaining portions being revealed portions of 10%, 20%, 30%, 40%, 50%, 60%, 70%, 80%, 90% and 100% (e.g., FIGS. 8B-8K, respectively). The randomized portion may include any dot proportion (e.g., percentage or ratio) of dots 127 to dots 129, e.g., 50% of each or any other proportion.

The obfuscation scheme may include one or more variations of adaptation factors. The adaptation factor may include any amount of time or number of selections or rounds before more information (e.g., object portions) is revealed. The obfuscation scheme may include an object proportion and a dot proportion in any increments, e.g., 1%, 5%, or 10%. The obfuscation scheme may utilize any number of dots for each letter (e.g., 6×8, 7×9, 10×12, 24×32, or 128×128 dots). The obfuscation scheme may include any number of characters in the word, such as 3, 5, 7 or 10 characters. The obfuscation scheme may reveal one or more characters at the same time, require one or more words before providing access to the target display area, and solve or adapt one or more objects (e.g., words or letters) at the same time by the same or different devices 103.

The obfuscation scheme may use any typeface or font used to create characters such as letters A-Z, e.g., typefaces or fonts such as Curfuffles (as shown) or Arial or Times New Roman. The obfuscation scheme may utilize words derived from dictionaries in any language (e.g., English, French, German, Tagalog, or Afrikaans), utilize non-romance or accent symbols (e.g., the letter "A" being considered equivalent to the letters "A", "A", "A", "A", "A", "A", and "A"), and utilize both capital letters and lowercase letters (e.g., the letter "A" being considered equivalent to "a") including with or without accents (e.g., the letters "A" and "a" and "O" and "o", respectively being equivalent). The equivalents may apply to all letters, accents and languages. The systems herein may be utilized in any electronic or physical format (e.g., electronic games, board games, card games, etc.)

User input areas 118 may utilize any user inputs for selecting or guessing letters. User input areas 118 may receive user inputs that are displayed in selection box 120. User input areas 118 may include or receive user inputs by way of a physical keyboard, touchscreen, voice recognition, visual-cues, indications using physical motion similar to the game of Charades, and thought-pattern recognition. The obfuscation scheme may position words or letters in different and/or various parts of user interface screen 116 (e.g., arranged randomly, horizontally, vertically and/or diagonally, forward or reverse order, crossword-type, or overlapping first and second objects).

The obfuscation scheme may adapt (e.g., by way of processor 105 on display 109) objects 121, 123 according to a predefined theme, length, meaning, part of speech, language origin, letter usage or significance relative to each other. This may include "Words that start with M", or "Seven Letter Words", or "Twelve Letter Words", or "Birds of the World", or "Names of Places and Things", "Nouns", "Verbs", "French Words", "Words of European Origin", "Words that Contain Two D's", or "Words that are One Letter Different from Each Other."

The obfuscation scheme may adapt (e.g., by way of processor 105 on display 109) the objects 121, 123 according to interactions between the first and second devices 103*a*, *b*. The first devices 103*a* may be configured to choose or decide which objects (e.g., one or more words, letters or random series of characters) the second device 103*b* may need to solve, or vice versa. The first device 103*a* may be configured to define how the objects 121, 123 are obscured and revealed, e.g., increasing and decreasing the randomness of the dots 127, 129, swapping two or more characters (e.g., letters), changing a character (e.g., a letter), or reversing a character set (e.g., word).

The system 100 may be configured to accommodate any number of devices 103 associated with human or automated users. The system 100 may be configured to allow a game in which a first user may "attack" a second user or a plurality of other users in response to user inputs such as correct selection. The system 100 may be configured to determine rankings of each user (e.g., first, second or third place).

The obfuscation scheme may adapt (e.g., by way of processor 105 on display 109) a transparency of dots 127, 129. For example, the transparency of dots 127, 129 may be adjusted as an alternative or in addition to the random reveal as described herein with respect to FIGS. 8A-K. The object portion 121, 123 may be adapted (e.g., by way of processor 105 on display 109) to become transparent, translucent, or invisible. The obfuscation scheme may include object portions that are images with individual pixels (e.g., pixelated image) and adapt the transparency of the images (e.g., as an alternative to or in addition to using dots). The obfuscation scheme may utilize any font, typeface, shading, highlighting, color, character style, bold/unbold, italic/non-italic, underlined/not underlined, etc.

The obfuscation scheme may utilize image association. The object may include a picture image (e.g., as an alternative or in addition to a character). The device 103 may be configured to slowly display the picture image as a hint for the object. For example, the device 103 may display a picture image of a cat or a hammer as a hint that the character set is a word starting with a first letter of "c" or "h," respectively. As another example, the obfuscation scheme may utilize a picture image (e.g., a type of hat such as a French chapeau) to provide a hint for a character of a word in a particular language (e.g., "c" for the French chapeau instead of "h" for hat in English)

The obfuscation scheme may adapt objects 121, 123 (e.g., by way of processor 105 on display 109) using image degradation. The device 103 may display an object that initially includes a pixilated image that degrades or morphs to a dot-formed letter associated with the pixilated image. For example, the pixilated image may include a dog suggesting a character "D" that degrades or morphs into a dot-formed character "D."

The obfuscation scheme may include character blocking. The device 103 may display a blocking object (e.g., blocking object 125) over the first and second objects 121, 123. The blocking object may include any object, item or creature that appears over or behind the first or second objects 121, 123. For example, in response to user inputs by the first device 103*a*, the device 103*b* may apply the blocking object over or behind the second object 123. The blocking object may be configured to obstruct the user interface screen 116 of the first or second device 103*a-b*. The blocking device may be or become immovable, movable, moving, stationary, removable, invisible, transparent or translucent, e.g., in response to user inputs. The obfuscation scheme may display the blocking object on one device 103 (e.g., device 103*b*) but not another device 103 (e.g., device 103*a*), or vice versa.

Figure 9:
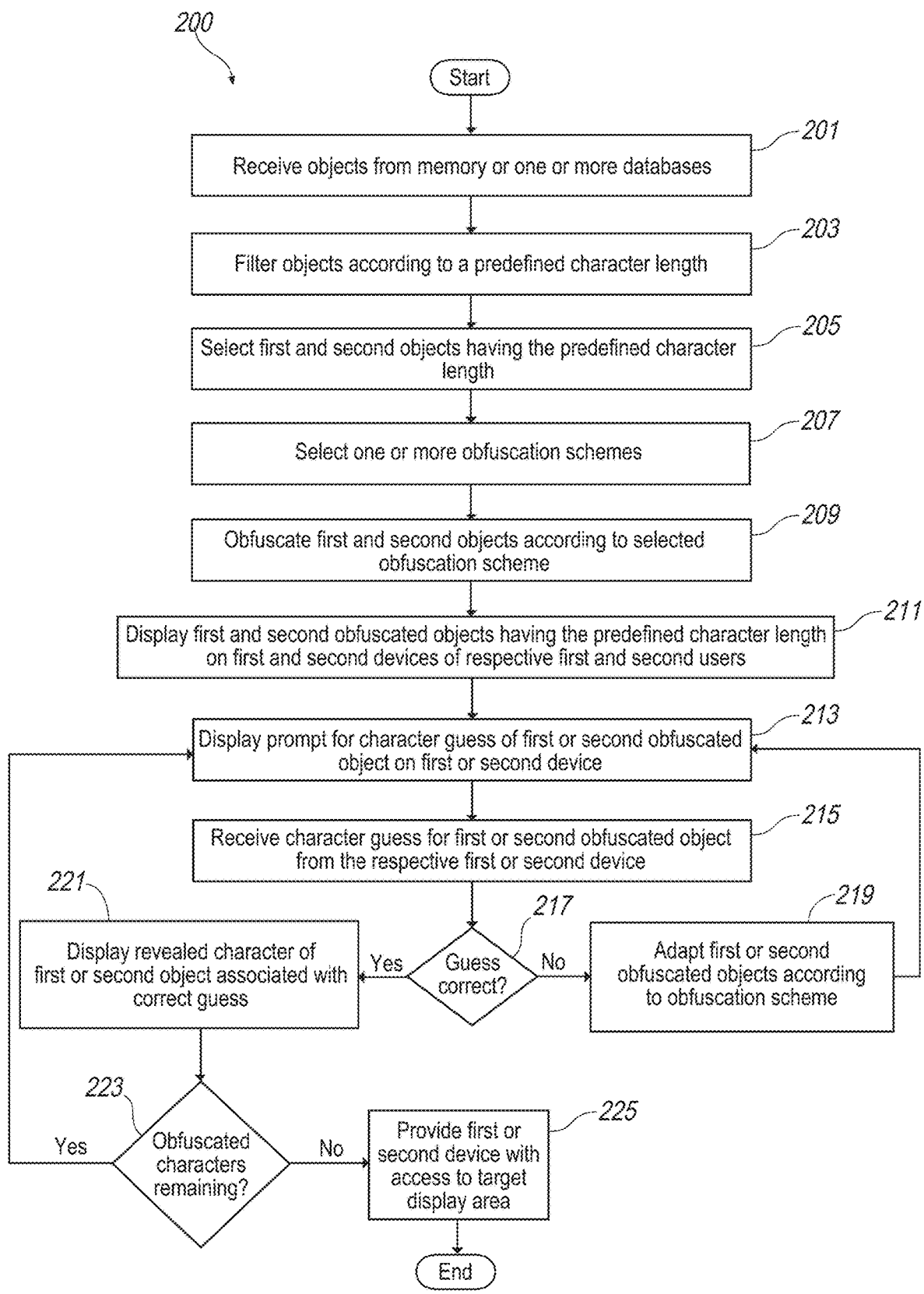
FIG. 9 illustrates an exemplary process of the present disclosure.

FIG. 9 illustrates an exemplary process 200, e.g., for adaptive obfuscation. Process 200 may take many different forms and include multiple and/or alternate components and/or implementations. While an exemplary process 200 is shown in FIG. 9, the illustrations are not intended to be limiting. Indeed, additional or alternative components and/or implementations may be used.

At block 201, first device 103a, second device 103b, and/or server 102 may receive, by memory 107, databases 113 and/or transceiver 111 in communication with network 101, a plurality of objects including first and second objects having respective first and second character sets with a predefined character length. The first device 103a, second device 103b, server 102 and databases 113 may be communicatively connected with each other by way of transceivers 111 and/or network 101. The plurality of objects may include first and second objects having respective first and second character sets.

At block 203, first device 103a, second device 103b, and/or server 102 may filter, by processor 105, the plurality of objects according to the predefined character length.

At block 205, first device 103a, second device 103b, and/or server 102 may select first and second objects of the plurality of objects having the predefined character length.

At block 207, first device 103a, second device 103b, and/or server 102 may select, by processor 105 and from memory 107 or databases 113, one or more obfuscation schemes defining an obfuscation condition according to at least one of an obscured condition, a partially obscured condition, and a revealed condition.

At block 209, first device 103a, second device 103b, and/or server 102 may obfuscate, by processor 105, the first and second objects to the obscured condition according to the selected obfuscation scheme.

At block 211, first device 103a and/or second device 103b may display, by display 109, the first and second obfuscated objects having the predefined character length on the first and second devices of respective first and second users. For example, first device 103a may display a first character set in first active display area 117a and a second character set in first mirrored display area 119a while the first and second character sets are in the obscured condition.

At block 213, first device 103a and/or second device 103b may display, by display 109, a prompt for a selection (e.g., one or more user inputs by way of user input area 118) for the first or second object on the first device 103a or second device 103b. For example, first device 103a may display, by display 109, a first prompt (e.g., selection box 120) for a first selection for a first character of the first character set.

At block 215, first device 103a and/or second device 103b may receive, by display 109, the selection for the first or second object. For example, first device 103a may receive, by way of a first user input into the first input area 118a of the first user interface screen 116a, the first selection for the first character.

At block 217, first device 103a, second device 103b, and/or server 102 may determine, by the processor 105, that the selection is a correct selection matching the first character or an incorrect selection not matching the first character.

At block 219, in response to the incorrect selection, first device 103a, second device 103b, and/or server 102 may adapt, by processor 105, the first and/or second objects 121, 123 according to the obfuscation scheme. For example, in response to the incorrect selection, the first device 103a may adapt, by the processor 105, the first character set from the obscured condition to a further obscured condition according to the obfuscation scheme. After block 219, the process 200 may return to block 213, e.g., first device 103a and/or second device 103b may display, by display 109, another prompt for a selection for the first or second object.

At block 221, in response to the correct selection, first device 103a or second device 103b may display, by display 109, the first and/or second objects 121, 123 in the unobfuscated condition. Alternatively or in addition, the other of the first device 103a or second device 103b may adapt, by processor 105, the first and/or second objects 121, 123 to a partially revealed or further obfuscated condition according to the obfuscation scheme.

At decision point 223, first device 103a, second device 103b, and/or server 102 may determine whether the first or second object includes any remaining obfuscated characters. In response to at least one character of the first character set being in the obfuscated or partially obfuscated condition, process 200 may return to block 213, e.g., first device 103a and/or second device 103b may display, by display 109, another prompt for a selection for the first or second object. In response to none of the characters of the first character set being in the obfuscated or partially obfuscated condition, provide, by display 109, access to a target display area.

At block 225, in response to none of the characters of a character set (e.g., the first character set) being in the obfuscated or partially obfuscated condition, provide or deny, by display 109, access to a target display area. After block 225, the process 200 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for adaptive obfuscation, the system comprising:
a first user interface device having a first hardware display with a first active display area and a first input area;
a hardware processor; and
a memory communicatively connected to the hardware processor to provide operations including:
receive a plurality of objects including a first object having a first character set with a predefined character length;
select, by the hardware processor, an obfuscation scheme defining an obfuscation condition according to at least one of an obscured condition, a partially obscured condition, and a revealed condition;
obfuscate, by the hardware processor, the first character set to the obscured condition according to the selected obfuscation scheme; and
display, by the first hardware display, the first character set in the first active display area, the first character set being in the obscured condition.

2. The system of claim 1, the first user input device further including a transceiver in communication with a network, and the operations further comprising:
receive, by the transceiver, an external input; and
at least one of:
adapt, by the hardware processor, the first character set from the obscured condition to a partially obscured condition based on at least one of the obfuscation scheme and the external input; and
adapt, by the hardware processor, the first character set from the obscured condition to a further obscured condition based on at least one of the obfuscation scheme and the external input.

3. The system of claim 1, the operations further comprising:
display, by the first hardware display, a first prompt for a first selection for the first character of the first character set;
receive, by way of a first user input into the first input area of the first hardware display, the first selection for the first character; and
determine, by the hardware processor, that the first selection is a correct selection matching the first character or an incorrect selection not matching the first character.

4. The system of claim 3, the operations further including:
in response to the correct selection,
adapt, by the hardware processor, the first character to the revealed condition; and
display, by the first hardware display, the first character in the revealed condition; and
in response to the incorrect selection,
adapt, by the hardware processor, the first character from the obscured condition to a further obscured condition according to the obfuscation scheme; and
display, by the first hardware display, the first character in the further obscured condition.

5. The system of claim 3, the operations further including:
determine whether the first character set includes any remaining obfuscated characters; and
at least one of:
in response to at least one character of the first character set being in the obfuscated or partially obfuscated condition, display, by the first hardware display, a second prompt for a second selection for a second character of the first character set; and
in response to none of the characters of the first character set being in the obfuscated or partially obfuscated condition, provide, by the first hardware display, access to a target display area.

6. The system of claim 3, wherein the first hardware display includes a first mirrored display area, and the plurality of objects includes a second object having a second character set with the predefined character length, and further comprising a second user interface device having a second hardware display with a second active display area, a second mirrored display area, and a second input area, the operations further comprising:
in response to the incorrect selection, receive, by the second user interface device, the first and second objects having the obfuscation condition according to the first user interface device; and
display, by the second hardware display, the first character set in the second mirrored display area and the second character set in the second active display area while the first user interface device displays the first character set in the first active display area and the second character set in the first mirrored display area.

7. The system of claim 6, the operations further comprising:
display, by the second hardware display, a third prompt for a third selection for a third character of the second character set;
receive, by way of a second user input into the second input area of the second hardware display, the third selection for the third character; and
determine, by way of the hardware processor, that the third selection is a correct selection matching the third character or an incorrect selection not matching the third character.

8. The system of claim 7, the operations further including:
in response to the correct selection for the third character, at least one of:
display, by the second hardware display, the third character in the revealed condition; and
further adapt, by the hardware processor and on the first hardware display, the first character set according to the obfuscation scheme; or
in response to the incorrect selection,
receive, by the first user interface device, the first and second objects having the obfuscation condition according to the second user interface device.

9. The system of claim 8, wherein the obfuscation scheme includes a plurality of adaptation factors, and the operations further including:
dynamically adapt, by the hardware processor, the obfuscation scheme according to the plurality of adaptation factors in response to at least one of the first, second and third selections.

10. A user interface device comprising:
a hardware processor;
memory in communication with the hardware processor;
a first hardware display with a first active display area and a first input area, the hardware processor providing operations comprising:

receive a plurality of objects including a first object having a first character set with a predefined character length;

select, by the hardware processor, an obfuscation scheme defining an obfuscation condition according to at least one of an obscured condition, a partially obscured condition, and a revealed condition;

obfuscate, by the hardware processor, the first character set to the obscured condition according to the selected obfuscation scheme; and display, by the first hardware display, the first character set in the first active display area, the first character set being in the obscured condition.

11. The user interface device of claim 10, further comprising a transceiver in communication with a network, wherein the operations further include:

receive, by the transceiver, an external input; and at least one of:
  adapt, by the hardware processor, the first character set from the obscured condition to a partially obscured condition based on at least one of the obfuscation scheme and the external input; and
  adapt, by the hardware processor, the first character set from the obscured condition to a further obscured condition based on at least one of the obfuscation scheme and the external input.

12. The user interface device of claim 10, further comprising:

display, by the first hardware display, a first prompt for a first selection for the first character of the first character set;

receive, by way of a first user input into the first input area of the first hardware display, the first selection for the first character; and determine, by the hardware processor, that the first selection is a correct selection matching the first character or an incorrect selection not matching the first character.

13. The user interface device of claim 12, the operations further including at least one of:

in response to the correct selection,
  adapt, by the hardware processor, the first character to the revealed condition; and
  display, by the first hardware display, the first character in the revealed condition; and in response to the incorrect selection,
  adapt, by the hardware processor, the first character from the obscured condition to a further obscured condition according to the obfuscation scheme; and
  display, by the first hardware display, the first character in the further obscured condition.

14. The user interface device of claim 12, the operations further including:

determine whether the first character set includes any remaining obfuscated characters; and at least one of:
  in response to at least one character of the first character set being in the obfuscated or partially obfuscated condition, display, by the first hardware display, a second prompt for a second selection for a second character of the first character set; and
  in response to none of the characters of the first character set being in the obfuscated or partially obfuscated condition, provide, by the first hardware display, access to a target display area.

15. The user interface device of claim 12, wherein the first hardware display is of a first user and includes a first mirrored display area associated with a second user interface device of a second user, the second user interface device having a second hardware display with a second active display area, a second mirrored display area, and a second input area, the plurality of objects include a second object having a second character set with the predefined character length, and the operations further comprise:

in response to the incorrect selection, receive, by the second user interface device of the second user and from the first user interface device of the first user, the first and second objects having the obfuscation condition according to the first user interface device; and display, by the second hardware display of the second user, the first character set in the second mirrored display area and the second character set in the second active display area while the first user interface device of the first user displays the first character set in the first active display area and the second character set in the first mirrored display area.

16. The user interface device of claim 15, the operations further comprising:

display, by the second hardware display, a third prompt for a third selection for a third character of the second character set;

receive, by way of a second user input into the second input area of the second hardware display, the third selection for the third character; and determine that the third selection is a correct selection matching the third character or an incorrect selection not matching the third character.

17. The user interface device of claim 16, the operations further including at least one of:

in response to the correct selection for the third character, at least one of:
  display, by the second hardware display, the third character in the revealed condition; and
  further adapt, by the hardware processor and on the first hardware display, the first character set according to the obfuscation scheme; and in response to the incorrect selection,
  receive, by the first user interface device, the first and second objects having the obfuscation condition according to the second user interface device.

18. The user interface device of claim 16, wherein the obfuscation scheme includes a plurality of adaptation factors, and the operations further including:

dynamically adapt, by the hardware processor, the obfuscation scheme according to the plurality of adaptation factors in response to at least one of the first, second and third selections.

19. A method for adaptive obfuscation, the method comprising:

providing a first user interface device having a hardware processor, a memory communicatively connected to the hardware processor, a first hardware display with a first active display area and a first input area, and a second hardware display with a second active display area and a second input area;

receiving a plurality of objects including a first object having a first character set with a predefined character length;

selecting, by the hardware processor, an obfuscation scheme defining an obfuscation condition according to at least one of an obscured condition, a partially obscured condition, and a revealed condition;

obfuscating, by the hardware processor, the first character set to the obscured condition according to the selected obfuscation scheme; and displaying, by the first hardware display, the first character set in the first active display area, the first character set being in the obscured condition.

20. The method of claim 19, wherein the first user interface device is of a first user, the second user interface device is of a second user, the first user interface device includes a first transceiver in communication with a network, the second user interface device includes a second transceiver in communication with the first transceiver by way of the network, and the operations further comprise:
receiving, by the first transceiver of the first user, an external input from the second transceiver; and
at least one of:
adapting, by the hardware processor and on the first hardware display, the first character set from the obscured condition to a partially obscured condition based on at least one of the obfuscation scheme and the external input; and
adapting, by the hardware processor and on the first hardware display, the first character set from the obscured condition to a further obscured condition based on at least one of the obfuscation scheme and the external input.

* * * * *